May 26, 1964     A. WEIS ETAL     3,134,470

CLUTCH CONTROL SYSTEM

Filed Oct. 17, 1960     2 Sheets-Sheet 1

Inventors
Alfred Weis
Heinrich Dick
Walter Susebach
by: George U Spencer
Attorney May 26, 1964    A. WEIS ETAL    3,134,470
CLUTCH CONTROL SYSTEM
Filed Oct. 17, 1960    2 Sheets-Sheet 2

Inventors
Alfred Weis
Heinrich Dick
Walter Susselbeck
by: George U Spencer
Attorney

United States Patent Office 3,134,470
Patented May 26, 1964

3,134,470
CLUTCH CONTROL SYSTEM
Alfred Weis, Olpe, Westphalia, Heinrich Dick, Cologne-Kalk, and Walter Sussebach, Olpe, Westphalia, Germany, assignors to Elektro-Mechanik-G.m.b.H., Olpe, Westphalia, Germany
Filed Oct. 17, 1960, Ser. No. 63,152
Claims priority, application Germany Oct. 19, 1959
15 Claims. (Cl. 192—3.5)

The present invention relates to electromagnetic and electromagnetically controlled clutches.

More particularly, the present invention relates to a rotational speed responsive control mechanism for electromagnetic or electromagnetically actuated clutches.

In general, every attempt has been and is being made to simplify the operation of machinery as much as possible, so that the operator is called upon to exert as little effort and concentration as possible. This is particularly so in the case of motor vehicle operation, so that especially in this art efforts are constantly being made to simplify the operation of the vehicle. While there exist various types of fully automatic transmission systems, i.e., transmission systems in which a variable transmission gear as well as a clutch are actuated automatically, it has been found desirable from the point of view of economy as well as reliability of operation to equip motor vehicles with so-called semi-automatic transmission systems, namely, a transmission system in which the variable transmission gear is shifted manually but wherein the clutch is actuated automatically. Such semi-automatic transmission systems have heretofore incorporated various types of mechanical clutches which were actuated by various means. It has been found, however, that electromagnetic and electromagnetically actuated clutches, hereinafter referred to simply as electromagnetic clutches, are readily controlled by an exciter current. Thanks to this and other advantages, which include the actuation of the clutch by remote control, electromagnetic clutches have become increasingly popular for use in combination with transmission gearing.

It is, therefore, an object of the present invention to provide a semi-automatic transmission arrangement, particularly a transmission arrangement suitable for use in a motor vehicle, in which an electromagnetic clutch is operated completely automatically.

It is another object of the present invention to provide an automatic control mechanism for an electromagnetic clutch, which mechanism overcomes the disadvantages of certain less sophisticated arrangements, as will be more fully described below.

With the above objects in view, the present invention resides mainly in a rotational speed responsive control mechanism for electromagnetic clutches, particularly for use in motor vehicle transmissions. The control mechanism comprises a constantly operating converter which measures the rotational speed of the engine, or a value proportional thereto, and converts the measured value into an output which varies with the rotational speed of the engine. This output, either directly or by way of a constantly operating amplifier, changes the excitation of the electromagnetic clutch when the engine operates above a predetermined rotational speed, and switching means are provided at the output of the converter which block the transmission of the output value of the converter when the output is substantially that produced at the idling speed of the engine.

Additional objects and advantages of the present invention will become apparent upon consideration of the following description when taken in conjunction with the accompanying drawings, in which.

Figure 1:
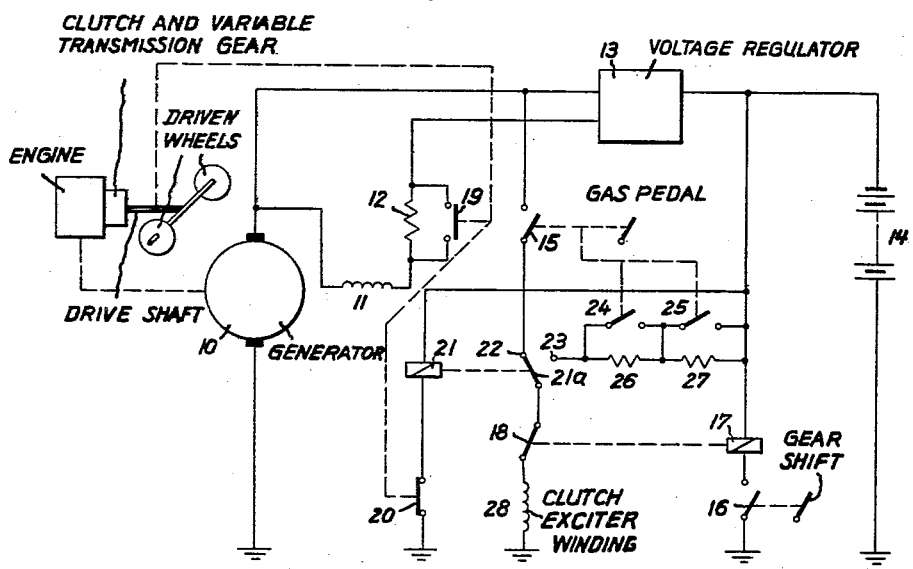
FIGURE 1 is a schematic circuit of an experimental arrangement with which it has been sought to actuate electromagnetic clutches; this arrangement is shown for explanatory purposes only and does not form part of the present invention.

Referring now to the drawings and to FIGURE 1 thereof in particular, there is shown an experimental arrangement with which it has been sought to actuate an electromagnetic clutch in a motor vehicle transmission system. To facilitate illustration of the circuit, the motor vehicle engine, the gas pedal, the clutch and variable transmission gear, the gear shift, the drive shaft, and the driven wheels are shown schematically and labelled by appropriate legends.

The electrical circuit comprises a generator 10 which is driven by the engine in a conventional manner, the generator field winding 11 which is connected in series with a limiting resistance 12, and a conventional voltage regulator 13 which is interposed between the generator 10 and the vehicle battery 14. The clutch has an exciter winding 28.

At low engine speeds, the excitation of the clutch is controlled by the generator voltage, the latter being, of course, dependent on the rotational speed of the engine. It will be appreciated, however, that the generator is usually so regulated that it will produce its maximum output voltage already at a time when the engine operates at idling speed. Therefore, in order to obtain from the generator 10 an output voltage which is still a function of the engine speed, the field excitation of the generator must be weakened, and this is accomplished by the above-mentioned resistance 12. Thus, while the generator 10 itself is so designed that it will, at engine idling speed, deliver sufficient current to supply the electrical accessories usually found on motor vehicles, such as lights, radio, blower, etc., the generator will not be able to do so after the resistance 12 has been interposed in the field circuit.

In FIGURE 1, the various circuit components are shown in the positions they occupy when the engine is idling and the gear shift is in "low." These components will be described in conjunction with a starting operation.

A switch 15 is mechanically connected with the gas pedal and remains in open position so long as the gas pedal is in a position at which the engine idles, i.e., so long as the driver does not depress the pedal. As a result, no current can flow to the clutch exciter winding 28, so that the clutch will not be able to transmit any torque. As soon as the driver commences to depress the gas pedal in order to move the vehicle, the switch 15 is closed and a current produced by the generator will flow through the winding 28. This current is dependent on the voltage across the generator 10 which, as stated above, is proportional to the engine speed. Thus, as the engine speed increases, more and more current will flow through the exciter winding so that the torque which the clutch is able to transmit will constantly increase. The vehicle will then commence to roll.

When the driver shifts to the next gear, the movement of the gear shift will close a switch 16, thereby actuating a relay 17 having a switch contact 18 which is in series with the exciter winding 28, the arrangement being such that, upon energization of the relay 17, the exciter winding circuit will be opened and will remain in open condition until the gear shifting operation has been completed.

The arrangement also includes a switch responsive to the speed of the vehicle as, for example, a centrifugal switch mechanically connected to the drive shaft of the vehicle. This switch includes a contact 19 which is so adjusted as to short-circuit the resistance 12 when the vehicle reaches a speed of about 12 m.p.h. Consequently, it will be only above this speed that the generator 10 will be able to produce the maximum output for which it was designed. This means that so long as the engine idles, as well as at low vehicle speeds, the battery 14 will not be charged; on the contrary, the battery is called upon to deliver electrical energy which the generator, due to resistance 12 in the field circuit, is incapable of producing. It will be readily understood that these conditions cannot be tolerated if the vehicle is to be used for city driving.

The centrifugal switch also includes a contact 20 which opens at the same time as the switch 19 closes, thereby de-energizing a relay 21 and moving the contact arm 21a from contact 22 to contact 23. The energization of the clutch exciter winding 28 is now no longer dependent upon the rotational speed of the engine, but on the position of the gas pedal. This is so because the exciter winding is now in series with resistances 26 and 27 which can be short-circuited by switches 24 and 25, respectively, the latter being arranged in the path of the gas pedal so that as the pedal is depressed, these switches will be closed successively. As a result, the resistances 26 and 27 will be short-circuited successively, thereby increasing the excitation of the winding 29. It will be appreciated that the position of the gas pedal is not necessarily an indication of the vehicle speed, so that if at low speeds the driver suddenly depresses the pedal, too much current will flow through the clutch exciter winding 29. This will cause the vehicle to be accelerated in a jerky manner.

The above explanation shows that the arrangement described in FIGURE 1, by means of which it has been sought automatically to control electric clutches, has the following disadvantages:

(1) The output voltage of the generator is artificially reduced, thus reducing the overall efficiency of the generator as a whole.

(2) Because of (1), the battery will not be charged until the vehicle reaches a certain minimum speed, so that the battery is called upon to provide a disproportionately large amount of energy.

(3) The system is not very reliable in operation because of the many relays and switches which incorporate a large number of movable parts.

(4) The energization of the clutch may vary haphazardly in that it is not dependent solely upon a value that bears a rational relationship to the operation of the vehicle.

Figure 2:
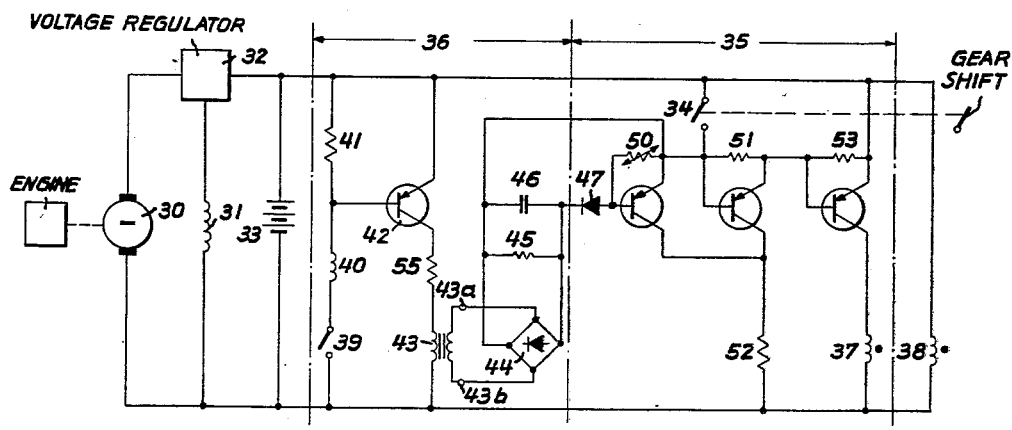
FIGURE 2 is a schematic circuit of one embodiment of a rotational speed responsive clutch control mechanism according to the present invention.

The above disadvantages are overcome by a rotational speed responsive clutch control mechanism according to the present invention. One embodiment of such a mechanism is illustrated in FIGURE 2, which shows a generator 30 driven by the vehicle engine, a generator field winding 31, a voltage regulator 32 and the vehicle battery 33. A converter 36 is connected to the above-described circuit and continuously produces an output which is a function of the rotational speed of the engine, as will be more fully described below, this output being connected to a transistor-equipped amplifier 35. The output of this amplifier, in turn, is connected to the exciter winding 37 of an electromagnetic clutch. If desired, a constantly energized counter-excitation coil 38 may be provided for eliminating the residual magnetism of the winding 37 when the latter is de-energized. Also, a switch 34, which is connected to the gear shift lever, is provided for short-circuiting the output of the converter 36 during gear shifting operation, so that the clutch is de-energized in an abrupt manner.

The converter 36 includes a branch constituted by the ignition interrupter contact 39 (the engine, in this case, being of a type which is equipped with an ignition circuit), the ignition coil 40 and a resistance 41. The voltage across resistor 41, the frequency of which is equal to the ignition frequency of the engine and, therefore, a measure of the rotational speed of the engine, is applied to a transistor amplifier stage 42. The output circuit of this amplifier stage 42 includes the primary winding of a transformer 43, this transformer being strongly saturated at low frequencies. Due to this saturation, a low voltage will, at low frequency, appear across the output terminals 43a, 43b of the secondary winding of the transformer 43.

As the rotational speed of the engine increases, the frequency of the voltage across the primary of transformer 43 likewise increases. Thus, the saturation of the transformer decreases, and the output voltage across terminals 43a, 43b increases accordingly. This output voltage is rectified by a bridge circuit 44 and the rectified voltage may be measured across a load constituted by a resistance 45 and a smoothing capacitor 46.

The output voltage of the converter, which is a function of the rotational speed of the engine, is connected to a diode 47 whose voltage-current characteristic is such that it will be conductive only when the voltage applied to the diode is greater than the threshold voltage of the diode. According to the present invention, the diode is one whose threshold voltage is greater than the voltage output produced by the converter 36 when the engine idles. Thus, if the vehicle is standing still and the engine idles, then the voltage output of the converter 36 will be insufficient to render the diode 47 conductive, so that the amplifier 35 will not cause any current to flow through the winding 37. In other words, when the engine is idling, the transistorized amplifier 35 will not be activated, the clutch exciting winding 37 will receive no current and the clutch will not transmit any torque.

Turning now to the details of the amplifier 35, the same incorporates one or more transistor stages which are so connected that the inherent temperature-dependency of the coefficient of amplification is utilized to the full, i.e., the fact that at low temperatures the amplification factor of a transistor amplifier is smaller than at higher temperatures is used to advantage. This is so because in order to obtain the flow of any particular collector current and, inasmuch as the clutch exciter winding is incorporated in the collector circuit of the last transistor stage, as shown in FIGURE 2, in order to cause any particular degree of clutch energization, a larger control current will be required during cold weather operation than during warm weather operation. But, as explained above, a higher control current is obtained by causing the engine to rotate at a higher rate, so that during cold weather driving the engine will have to be turned at a higher r.p.m. in order to obtain a particular degree of coupling, i.e., a particular torque transmission which, at higher temperature, would already be reached at a lower r.p.m. Thus, the idling speed of the engine may be increased for cold weather operation without this having any adverse effect on the clutch control mechanism. In this way, a normally undesirable characteristic of transistors, namely, temperature dependency, is used to counteract the tendency of an internal combustion engine to stall while idling at low temperature.

As explained above, when the gear shift lever is actuated, the switch 34 will short-circuit the output of the converter 36 so that the clutch is de-energized in an abrupt manner. It will now be seen that the switch will short-circuit not only the output of the converter 36 but one stage of the amplifier 35 as well. As a result, all subsequent amplifier stages will be ineffective. However, when the gear shifting operation is completed and the switch 34 is closed, the re-excitation of the clutch winding occurs in accordance with a preselected time constant which is determined by the capacity of capacitor 46, the resistances 50, 51, 52 and 53 in the amplifier, and the inductance of the clutch exciter winding 37. This time constant, which can be varied by adjusting the variable resistance 50, will result in a gentle reengagement of the clutch, thereby avoiding jerky motion of the vehicle.

Figure 3A:
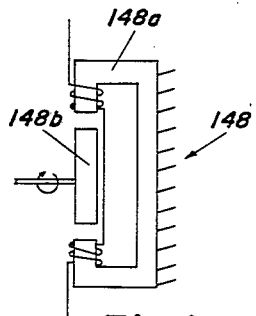
FIGURE 3a shows a detail of a component of the circuit of FIGURE 3.
Figure 3:
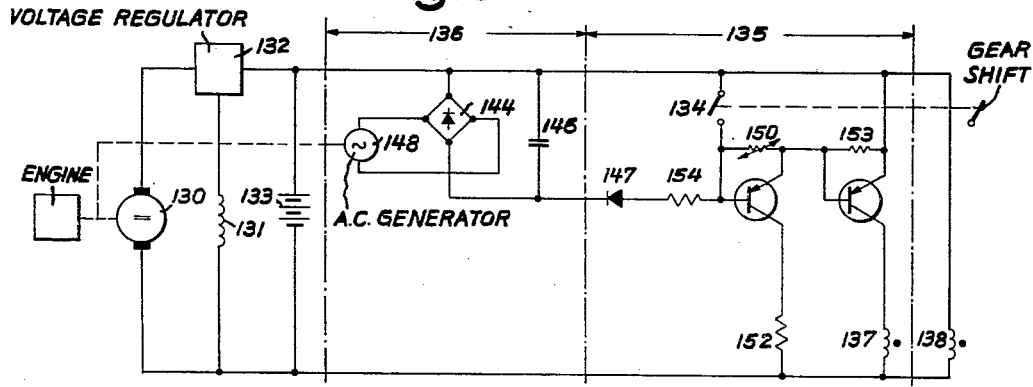
FIGURE 3 is a schematic circuit of another embodiment of a rotational speed responsive clutch control mechanism according to the present invention.

In the embodiment of FIGURE 3, the elements 130 to 138, 144, 146, 147, 150 and 152 and 153 correspond to elements 30 to 38, 44, 46, 47, 50, 52 and 53, respectively, of FIGURE 2, there being an additional resistor 154 in circuit with the diode 47. The embodiment of FIGURE 3 differs from that of FIGURE 2 in that the converter 136 comprises an A.C. tachometer 148 which is driven by the engine, so that the output voltage of the tachometer 148 is a function of the engine speed. This output voltage is rectified by the bridge circuit 144 and smoothed by the capacitor 146. According to the present invention, the A.C. tachometer can comprise permanent magnet means and coil means, one of which means is stationary and the other of which is connected to a rotating component of the clutch; one of these possibilities is shown in FIGURE 3a in which the tachometer 148 is depicted as including stationary coil means 148a and rotatable permanent magnet means 148b. The circuit of FIGURE 3 differs from that of FIGURE 2 also in that the amplifier 135 includes but two transistor stages.

Figure 4:
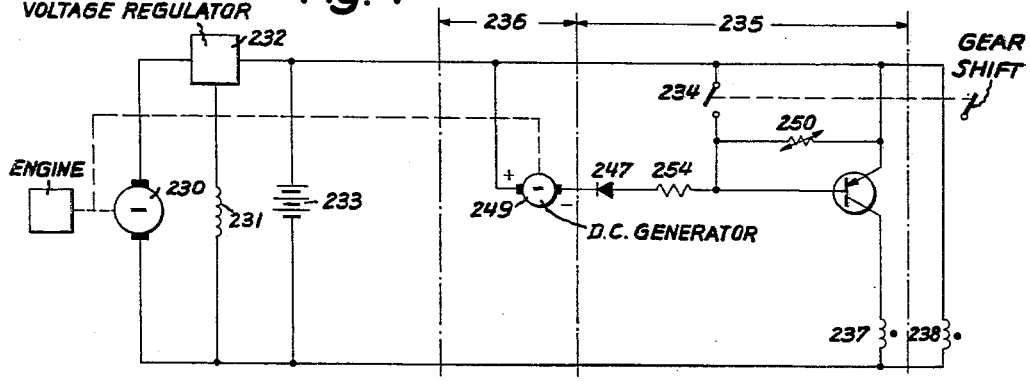
FIGURE 4 is a schematic circuit of yet another embodiment of a rotational speed responsive clutch control mechanism according to the present invention.

In the embodiment of FIGURE 4, wherein elements 230 to 238, 247, 250 and 254 correspond to elements 130 to 138, 147, 150, and 154, respectively, of FIGURE 3, the converter 236 uses a D.C. generator 249 which is driven by the engine and thus produces an output control voltage which is a function of the engine speed. The instant embodiment differs from the previous ones also in that a single stage transistor amplifier is used.

It will be seen that, while the arrangement according to FIGURE 2 is suited for use with an internal combustion engine incorporating an ignition circuit, the arrangements according to FIGURES 3 and 4 can be used in conjunction with other engines, as, for example, a diesel engine which does not have an ignition circuit.

Figure 5:
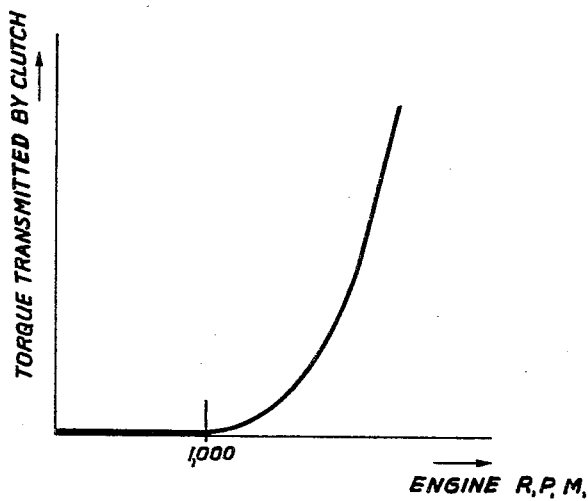
FIGURE 5 is a plot showing the torque transmitted by the clutch versus engine speed, this plot being a typical characteristic curve of a rotational speed responsive clutch control mechanism according to the present invention.

The characteristic of the control mechanism according to the present invention, which may be a composite of the characteristics of the converter and of the amplifier, is determined by the individual circuit components, the selection of which is prescribed by the particular engine and clutch device to be used. For example, in the embodiment of FIGURE 2, the overall characteristic is particularly influenced by the selection of the transformer 43, the diode 47 and the resistances 50 to 53. In general, it is sought to obtain a characteristic such as is shown in FIGURE 5, which is a plot of the torque transmitted by the clutch versus engine speed. The motor speed below which the diodes 47, 147, 247 are kept in non-conductive state and thus block the converter output from being applied to the clutch winding, i.e., the idling speed at which no torque will be transmitted by the clutch, is about 1,000 r.p.m. The clutch, which may be of the magnetic powder type, will not transmit any torque until this speed is reached, whereupon the vehicle is gently set into motion.

It will be appreciated that a rotational speed responsive clutch control mechanism according to the present invention avoids the above-enumerated drawbacks of the circuit shown in FIGURE 1. In a circuit according to the present invention, the voltage output of the generator is not artificially reduced so that even at idling speed the generator may be relied on to supply the necessary electrical energy. Nor are there any relays, and the only remaining switch is that which is connected to the gear shift. This switch is normally of sturdy construction and can therefore be expected to give no trouble in operation. Furthermore, inasmuch as in a circuit according to the present invention all of the circuit components operate continuously, the clutch excitation will always be that which is required at the moment. It will be noted that the engine speed alone controls the clutch energization and it is precisely this value which is the one that determines the maximum torque which can be transmitted by the clutch. For optimum operation, the characteristic of the control mechanism according to the present invention is such that at the beginning, the maximum torque which can be transmitted is less than the torque which can be delivered by the engine, whereas when the clutch is fully energized, the maximum transmittable torque is greater than that of the engine.

It will be understood that the above description of the present invention is susceptible to various modifications, changes and adaptations, and the same are intended to be comprehended within the meaning and range of equivalents of the appended claims.

We claim:

1. A rotational speed responsive control mechanism for the transmission system of a vehicle having an engine, a generator driven by said engine, and an electromagnetic clutch, said mechanism comprising, in combination:

(a) converter means independent of the magnitude of the output voltage of said generator for continuously producing an output signal which is at all times a function of the rotational speed of the engine;

(b) continuously operative control means have an input connected to the output of said converter means, said control means having an output connected to said clutch for controlling the excitation thereof; and (c) exclusively electronic means also connected to the output of said converter means for preventing the output signal thereof from being applied to said control means when said output signal is substantially that which is produced by said converter means while said engine operates at idling speed.

2. The mechanism defined in claim 1 wherein said converter means comprise a device which is mechanically coupled to said engine.

3. The mechanism defined in claim 2 wherein said device of said converter means comprises a D.C. generator driven by said engine.

4. The mechanism defined in claim 2 wherein said device of said converter means comprises an A.C. generator driven by said engine, and means connected to the output of said generator for rectifying and smoothing the output thereof.

5. The mechanism defined in claim 4 wherein said A.C. generator comprises permanent magnet means and coil means, one of said two last-mentioned means being stationary and the other being connected to a rotating component of said clutch.

6. The mechanism defined in claim 1 wherein said converter means comprise a device which is responsive to a value proportional to the rotational speed of said engine.

7. The combination defined in claim 6 wherein said engine of the vehicle is provided with an ignition circuit, and wherein said device of said converter means comprises means for deriving from said ignition circuit a signal whose frequency is equal to the ignition frequency, said last-mentioned signal constituting the input signal which is applied to said converter means.

8. The mechanism defined in claim 7 wherein said converter means comprise a resistance connected in the primary of the ignition circuit of said engine; an amplifier having an input and an output; means for applying to said input of said amplifier the voltage across said resistance, the frequency of which voltage varies proportionally with the rotational speed of said engine; a transformer having a primary and a secondary, said primary being in circuit with said output of said amplifier; rectifier means having an input connected to said secondary of said transformer; and a load circuit connected to the output of said rectifier means, the voltage across said load being said output of said converter means.

9. The mechanism defined in claim 8 wherein said load comprises a resistor and a capacitor, the output of said converter means being measured across said capacitor.

10. The mechanism defined in claim 1, further comprising means for applying a small counter-excitation to said clutch for counter-acting residual magnetism of said clutch after demagnetization thereof.

11. The mechanism defined in claim 1 wherein said control means incorporate amplifier transistor means, the latter being so connected that for predetermined collector currents higher control voltages are required at lower temperatures than at higher temperatures, so that at said lower temperatures higher rotational speeds of said engine are required than at said higher temperatures.

12. The mechanism defined in claim 1 wherein said control means incorporate amplifier transistor means and wherein an exciting winding of said electromagnetic clutch is incorporated in the collector circuit of said transistor means.

13. The mechanism defined in claim 1 wherein said electronic means comprise an electronic switching device.

14. The mechanism defined in claim 13 wherein said switching device comprises rectifier diode means and wherein said converter means comprise means for applying to said diode means the threshold voltage thereof when said engine operates just above idling speed.

15. The combination defined in claim 1 wherein the vehicle is also provided with a gear shift and wherein said mechanism further comprises switching means mechanically connected to said gear shift and electrically connected with said control means for reducing the excitation of said clutch abruptly upon initiation of a gear shifting operation and for gently re-exciting said clutch upon completion of the gear shifting operation.

References Cited in the file of this patent

UNITED STATES PATENTS

| | | |
|---|---|---|
| 2,539,649 | Winther | Jan. 30, 1951 |
| 2,688,388 | Gill | Sept. 7, 1954 |
| 2,718,157 | Schaub | Sept. 20, 1955 |
| 2,759,580 | Bower | Aug. 21, 1956 |
| 2,761,538 | Jaeschke | Sept. 4, 1956 |
| 2,788,872 | Winther | Apr. 16, 1957 |
| 2,880,831 | Maurice et al. | Apr. 7, 1959 |
| 2,974,769 | Henderson | Mar. 14, 1961 |
| 2,990,927 | Steadman | July 4, 1961 |
| 2,999,573 | Maurice et al. | Sept. 12, 1961 |